(12) United States Patent
White

(10) Patent No.: US 6,723,919 B1
(45) Date of Patent: Apr. 20, 2004

(54) CROSSBOX WITH SLIDING BINDING POST MECHANISM

(75) Inventor: Isaac D. White, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/414,074

(22) Filed: Apr. 15, 2003

(51) Int. Cl.$^7$ .................................................. H02G 3/08
(52) U.S. Cl. .......................... 174/50; 174/48; 174/57; 439/219
(58) Field of Search .............................. 174/50, 48, 53, 174/58, 57, 59, 135; 220/3.2, 3.8, 4.01, 4.02; 439/151, 169, 219, 713, 51, 54, 212, 676; 379/19, 1.01; 361/724, 600, 727; 211/46, 26, 162

(56) References Cited

U.S. PATENT DOCUMENTS

| | | | | |
|---|---|---|---|---|
| 3,796,848 A | * | 3/1974 | Southworth, Jr. | ........... 361/633 |
| 4,117,264 A | * | 9/1978 | Charles et al. | .................. 379/9 |
| 4,799,251 A | * | 1/1989 | Smith et al. | ............... 379/1.01 |
| 5,418,328 A | * | 5/1995 | Nadeau | ........................ 174/48 |
| 5,456,608 A | * | 10/1995 | Rogers et al. | .............. 361/633 |
| 5,835,567 A | * | 11/1998 | Woods | ......................... 379/21 |
| 6,031,349 A | * | 2/2000 | Hard et al. | .................. 379/271 |
| 6,039,578 A | * | 3/2000 | Suffi et al. | ..................... 379/19 |
| 6,252,941 B1 | * | 6/2001 | Daoud | .......................... 379/19 |
| 6,418,195 B1 | * | 7/2002 | Autry et al. | ............... 379/1.01 |

* cited by examiner

Primary Examiner—Anthony Dinkins
Assistant Examiner—Angel R. Estrada
(74) Attorney, Agent, or Firm—Kirkpatrick & Lockhart LLP

(57) ABSTRACT

A connection box including a binding post and a sliding binding post mechanism. The sliding binding post mechanism includes a top rail, a bottom rail, a side rail slidably engaged in the top rail and the bottom rail, and a binding post connector mechanism slidably engaged in the side rail, the binding post connector mechanism having a binding post connector attached thereto and configured to provide an electrical connection to the binding post.

19 Claims, 3 Drawing Sheets

FIG. 1 - PRIOR ART

CROSSBOX WITH SLIDING BINDING POST MECHANISM

BACKGROUND

The present invention is directed generally and in various embodiments to a crossbox with sliding binding post rails.

Cross boxes (also known as street cabinets, cross-connection boxes, or junction boxes), are used to house wires, fibre and components for telecommunications networks, cable television systems, and the like. For example, a crossbox may be installed in a telecommunications network to terminate optical fibres to copper wires or to provide an enclosure for housing copper wire splices.

FIG. 1 is a diagram illustrating a perspective view of a prior art crossbox 10. The crossbox 10 includes a housing 12 that is constructed of a durable material such as, for example, steel. The crossbox 10 also includes a door 14 that may be closed and secured via a latch 16. The door 14 may be secured to the crossbox 10 and permitted to swing open via hinges 18. A grid 20 of binding posts 22 is located in the housing 12 of the crossbox 10. The binding posts 22 are constructed of a conductive material and provide a connection for wires either on the backside of the binding posts 22 or the front side of the binding posts 22. The binding posts 22 provide an electrical contact for the wire or wires that are attached to the binding posts 22. The binding posts 22 may be arranged in pairs and, in a telecommunications application, a pair of binding posts 22 may correspond to pairs of tip and ring wires and may form an array of rows and/or columns.

For testing purposes, wires 24 may be attached to the door 14 via conductive attachment posts 26. The wires 24 may be terminated by electrical clips 28. The electrical clips 28 may be, for example, alligator clips. In operation, a technician may attach the clips 28 to one or more binding posts 22. The technician may then attach leads from a test device, such as a telephone butt set, to the attachment posts 26. Thus, if the crossbox 10 is used in a telecommunications system, each of the wires 24 may be attached to binding posts that correspond to the tip and the ring signals of a telephone line to be tested. Such an arrangement eliminates the need for the technician to attach leads from the test set to the binding posts 22.

SUMMARY

In one embodiment, the present invention is directed to a connection box. The connection box includes a binding post and a sliding binding post mechanism. The sliding binding post mechanism includes a top rail, a bottom rail, a side rail slidably engaged in the top rail and the bottom rail, and a binding post connector mechanism slidably engaged in the side rail, the binding post connector mechanism having a binding post connector attached thereto and configured to provide an electrical connection to the binding post.

In one embodiment, the present invention is directed to a binding post connector mechanism. The mechanism includes a plate, an axle disposed in the plate, a slidable element located on the axle and configured to be disposed in a channel of a side rail located in a connector box, and a first binding post connector disposed in the plate and configured to make electrical contract with a first binding post in a connector box.

In one embodiment, the present invention is directed to a connection box. The connection box includes a plurality of binding posts and means for electrically engaging at least one of the binding posts. The means for electrically engaging includes a plurality of rails and bindind post connector means slidably engaged in at least one of the rails, the binding post connector means having a binding post connector attached thereto and configured to provide an electrical connection to the binding post.

BRIEF DESCRIPTION OF THE DRAWINGS

Further advantages of the present invention may be better understood by referring to following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
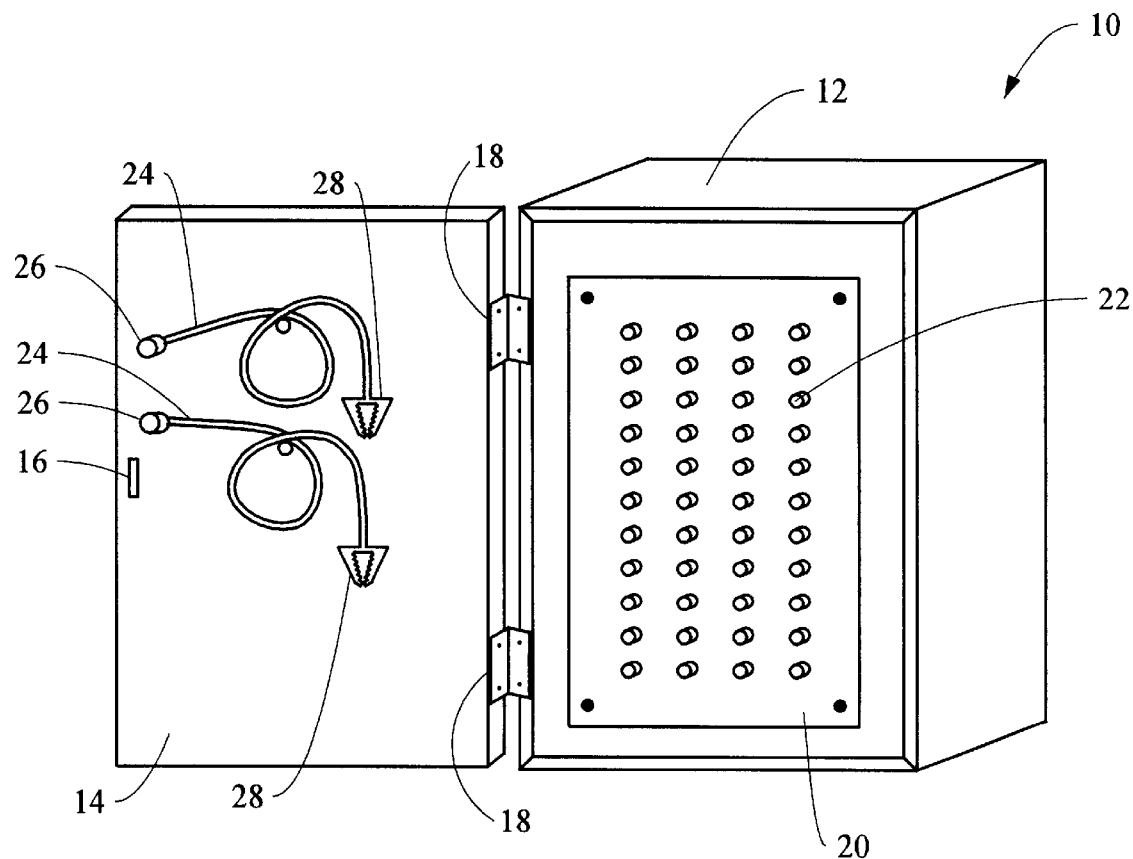
FIG. 1 is a diagram illustrating a perspective view of a prior art crossbox.
Figure 2:
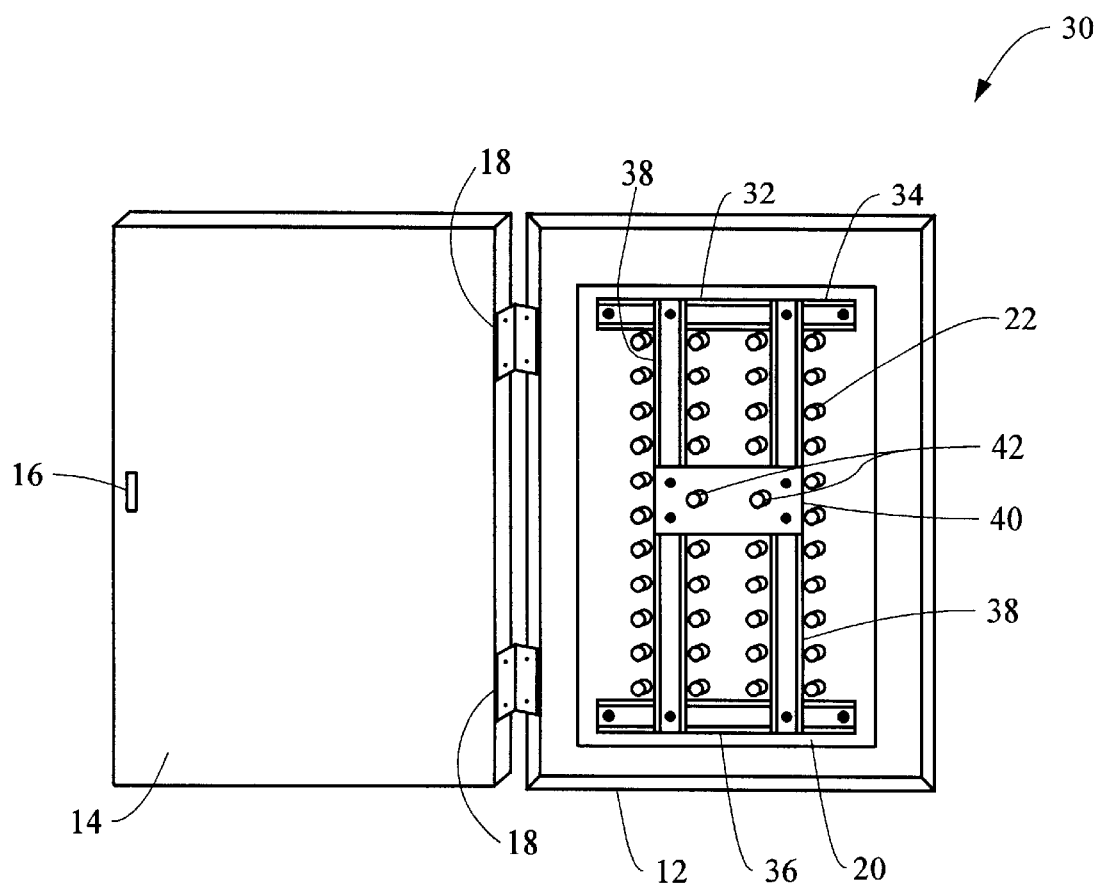
FIG. 2 is a diagram illustrating a front view of a crossbox having a sliding binding post mechanism according to one embodiment of the present invention.

FIG. 2 is a diagram illustrating a front view of a crossbox 30 having a sliding binding post mechanism 32 according to one embodiment of the present invention. The sliding binding post mechanism 32 includes a top rail 34 and a bottom rail 36 that are attached via, for example, a mechanical fastener or a weld, to the grid 20. The top rail 34 and the bottom rail 36 may be constructed of, for example, any type of suitable metal or plastic and, as illustrated hereinbelow in connection with FIG. 3, may be formed or molded such that the rails 34,36 have channels formed therein.

The sliding binding post mechanism 32 also includes one or more side rails 38. The side rails 38 may be constructed of, for example, any type of suitable metal or plastic and may be formed or molded such that the rails 38 have channels formed therein. As illustrated hereinbelow in connection with FIG. 4, the side rails 38 may be slidably engaged in the channels of the top rail 34 and the bottom rail 36 using, for example, slidable elements such as wheels, bearings, or rollers. A binding post connector assembly 40 may be slidably engaged in the channels of the side rails 38 using, for example, slidable elements such as wheels, bearings or rollers.

The binding post connector assembly 40 may include one or more binding post connectors 42. The binding post connectors 42 may be constructed of any type of conductive material. In operation, the side rails 38 may be moved horizontally and the binding post connector assembly 40 may be moved vertically such that the undersides of the binding post connectors 42 make electrical contact with the desired binding posts 22. Such an arrangement allows, for example, a technician to connect leads from a telephone butt set to the binding post connectors 42.

Figure 3:
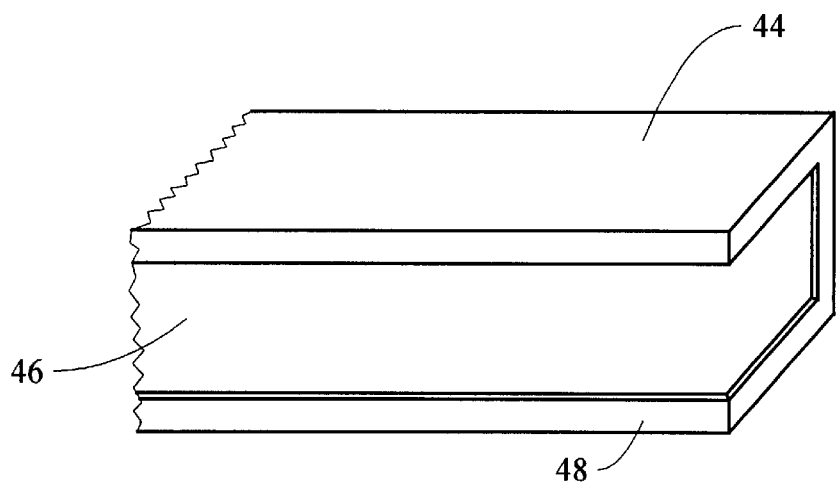
FIG. 3 is a diagram illustrating a perspective view of a portion of the top rail of FIG. 2 according to one embodiment of the present invention.

FIG. 3 is a diagram illustrating a perspective view of a portion 44 of the top rail 34 of FIG. 2 according to one embodiment of the present invention. It can be understood that the bottom rail 36 may be similarly constructed as the top rail 34 as illustrated in FIG. 3. As can be seen in FIG. 3, the portion 44 includes a channel 46 in which the side rails 38 may be slidably engaged. A lip portion 48 of the portion 44 may retain slidable elements such as, for example, wheels, rollers, or bearings that are attached to the side rails 38 and located within the channel 46.

Figure 4:
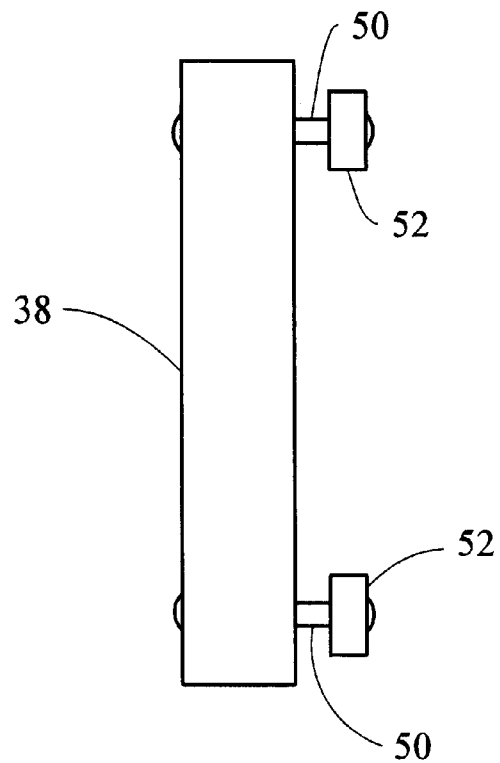
FIG. 4 is a diagram illustrating a side view of the side rails of FIG. 2 according to one embodiment of the present invention.

FIG. 4 is a diagram illustrating a side view of the side rails 38 of FIG. 2 according to one embodiment of the present invention. The side rails 38 may include axles 50 that extend through the rails 38. Slidable elements such as wheels 52 may be attached to the axles 50 in any conventional manner. The wheels 52 may be constructed of any durable material such as, for example, metal, rubber, plastic, or any combination thereof. In one embodiment, the side rails 38 include rollers or bearings instead of the wheels 52 as slidable elements. In one embodiment, the side rails have a similar construction as that illustrated in FIG. 3, including a channel and a lip portion.

Figure 5:
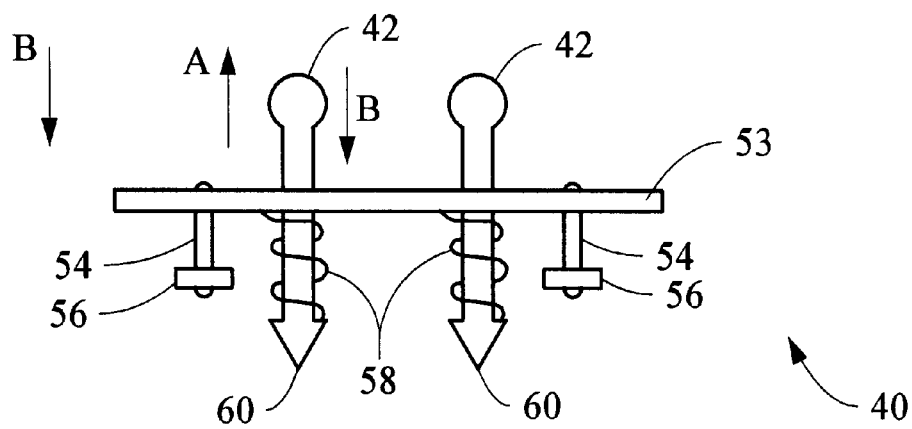
FIG. 5 is a diagram illustrating a side view of the binding post connector assembly of FIG. 2 according to one embodiment of the present invention.

FIG. 5 is a diagram illustrating a side view of the binding post connector assembly 40 of FIG. 2 according to one embodiment of the present invention. The assembly 40 may include a plate 53 that has one or more axles 54 that have slidable elements such as wheels 56. The plate 53 may be constructed of any suitable material such as, for example, metal or plastic. However, it may be desirable to have the plate 53 be constructed of non-conducting material and/or configure the plate 53 to be electrically isolated from the binding post connectors 42. The wheels 56 may fit into and be retained by the channels of the side rails 38. Referring to FIG. 2, the wheels 56 may allow the assembly 40 to be moved vertically in the crossbox 30. The assembly 40 may include any number of wheels 56. For example, the assembly 40 may include two wheels 56 for each side rail 38. The wheels 56 may be constructed of any durable material such as, for example, metal, rubber, plastic, or any combination thereof. In one embodiment, the assembly 40 includes rollers or bearings instead of the wheels 56 as slidable elements.

The binding post connectors 42 may include springs 58 that allow the binding post connectors 42 to be lifted in the direction as indicated generally by the reference character A in FIG. 5. When no force is exerted in the A direction, the springs 58 retain the binding post connectors 42 in the direction as indicated generally by the reference character B in FIG. 5.

In operation, a user of the crossbox 30 may pull the binding post connectors 42 in direction A and position the binding post connectors 42 over the desired binding posts 22 by moving the assembly 40 vertically in the side rails 38 and/or horizontally by moving the side rails 38 in the top rail 34 and the bottom rail 36. The user may release the binding post connectors 42 to allow contact ends 60 of the binding post connectors 42 to contact the desired binding posts 22. The user may then attach electrical leads from, for example, test equipment to the binding post connectors 42. In one embodiment, it is not necessary for the user to pull the binding post connectors 42 in direction A because as the assembly 40 is moved horizontally and/or vertically, the springs 58 allow the binding post connectors to move relatively freely in directions A and B and thus permit movement of the assembly 40.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A connection box, comprising:
   a binding post; and
   a sliding binding post mechanism, the sliding binding post mechanism comprising:
   a top rail;
   a bottom rail;
   a side rail slidably engaged in the top rail and the bottom rail; and
   a binding post connector mechanism slidably engaged in the side rail, the binding post connector mechanism having a binding post connector attached thereto and configured to provide an electrical connection to the binding post, and wherein the side rail includes a channel in which the binding post connector mechanism is slidably engaged.

2. The connection box of claim 1, further comprising a second side rail slidably engaged in the top rail and the bottom rail, wherein the binding post connector mechanism is slidably engaged to the second side rail.

3. The connection box of claim 1, wherein the top rail and the bottom rail each have a channel in which the side rail is slidably engaged.

4. The connection box of claim 1, wherein the side rail includes a slidable element disposed in a channel in the top rail and a channel in the bottom rail.

5. The connection box of claim 1, wherein the binding post connector mechanism includes a slidable element disposed in a channel in the side rail.

6. The connection box of claim 1, wherein the binding post connector mechanism includes a spring that is configured to bias the binding post connector.

7. The connection box of claim 1, wherein the bottom rail and the top rail are arranged in a substantially parallel manner.

8. The connector box of claim 7, wherein the side rail is arranged in a substantially perpendicular manner to the bottom rail and the top rail.

9. The connector box of claim 1, wherein the binding post connector is configured to be moved away from the binding post while the binding post connector mechanism is moved.

10. A binding post connector mechanism, comprising:
    a plate;
    an axle disposed in the plate;
    a slidable element located on the axle and configured to be disposed in a channel of a side rail located in a connector box; and
    a first binding post connector disposed in the plate and configured to make electrical contact with a first binding post in a connector box.

11. The binding post connector mechanism of claim 10, wherein the first binding post connector is electrically isolated from the plate.

12. The binding post connector mechanism of claim 10, wherein the slidable element is one of a wheel, a roller, and a bearing.

13. The binding post connector mechanism of claim 10, further comprising a spring configured to bias the first binding post connector in relation to the plate.

14. The binding post connector mechanism of claim 10, further comprising a second binding post connector disposed in the plate, wherein the second binding post connector is configured to make electrical contact with a second binding post in the connector box.

15. The binding post connector mechanism of claim 14, wherein the first binding post is connected to a tip wire and the second binding post is connected to a ring wire.

16. A connection box, comprising:

a plurality of binding posts; and means for electrically engaging at least one of the binding posts, the means for electrically engaging comprising:

a plurality of rails; and binding post connector means slidably engaged in a channel of at least one of the rails, the binding post connector means having a binding post connector attached thereto and configured to provide an electrical connection to the binding post.

17. The connection box of claim 16, wherein the binding post connector means is slidably engaged in the at least one of the rails by way of slidable means.

18. The connection box of claim 16, wherein the slidable means is one of a wheel, a roller, and a bearing.

19. The connection box of claim 16, wherein the binding post connector means includes a biasing means to bias the binding post connector.

* * * * *